F. J. WATKINSON.
COMBINED AUTOMATIC DUSTER AND BRAKE FOR WINDOW BLINDS AND SHADES.
APPLICATION FILED SEPT. 9, 1907.
907,429.
Patented Dec. 22, 1908.
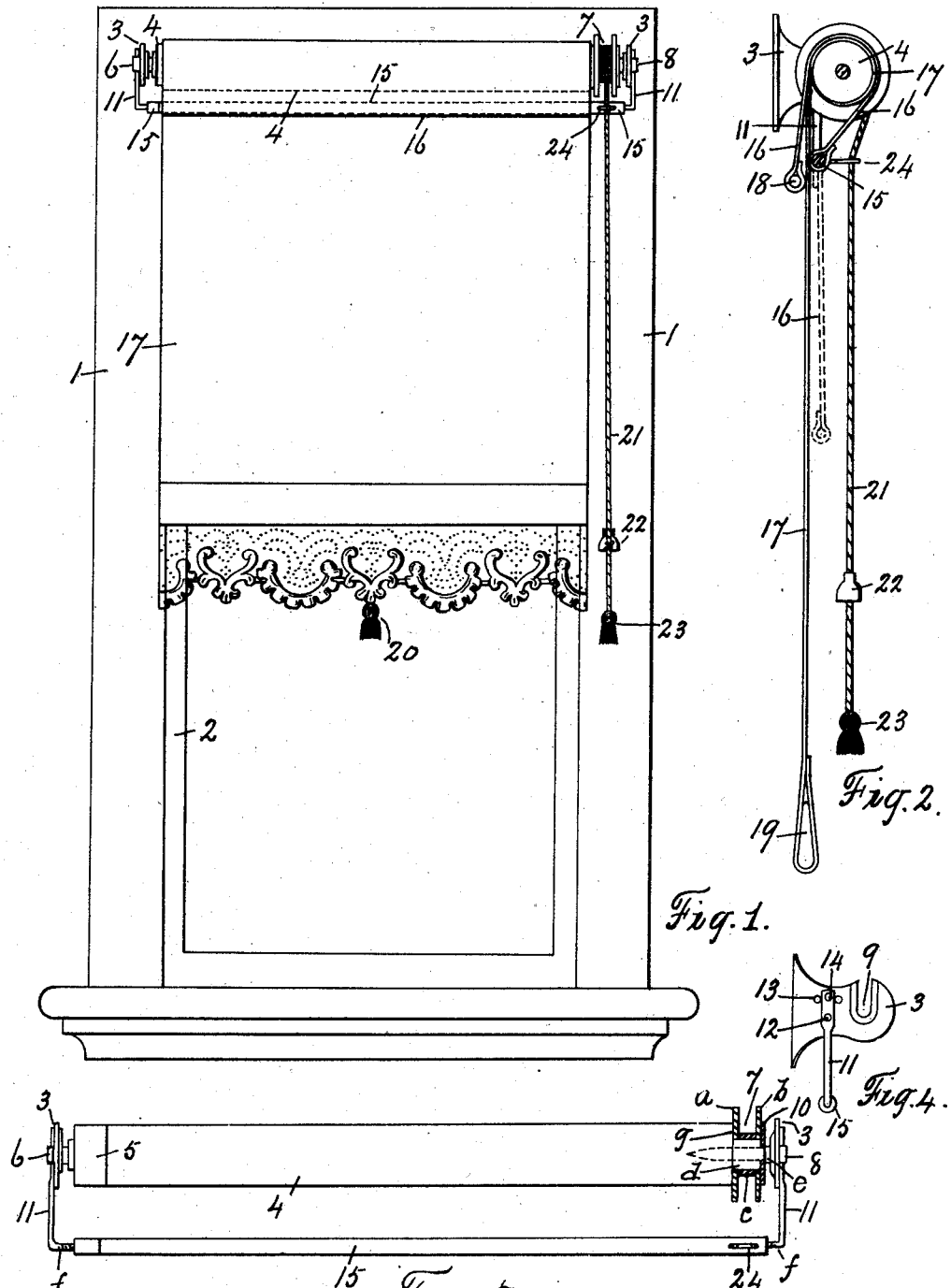

UNITED STATES PATENT OFFICE.

FREDERICK J. WATKINSON, OF STRATHROY, ONTARIO, CANADA, ASSIGNOR OF ONE-HALF TO CHARLES H. ROUTLIFFE, OF TORONTO, CANADA.

COMBINED AUTOMATIC DUSTER AND BRAKE FOR WINDOW BLINDS AND SHADES.

No. 907,429.     Specification of Letters Patent.     Patented Dec. 22, 1908.

Application filed September 9, 1907. Serial No. 392,067.

*To all whom it may concern:*

Be it known that I, FREDERICK J. WATKINSON, a subject of the King of Great Britain, and a resident of the town of Strathroy, in the county of Middlesex, in the Province of Ontario, Canada, have invented a new and useful Combined Automatic Duster and Brake for Window Blinds and Shades, of which the following is a specification.

This invention consists of an apron or duster which extends over the roller to which the blind is secured, for the purpose of preventing dust from settling or collecting on the blind, and thus avoid the unsightly dust streaks which are so common on blinds in ordinary use; and an apron or duster adapted to brush off all flies and insects as the blind is being rolled up, the result of which is to prevent flies and insects from being crushed, and to avoid all smearing of the blind from this cause, which crushing and smearing of flies and insects on blinds in ordinary use is also common; and of an apron or duster that will act as a brake to securely hold the blind at any position high or low on the window without any possibility of accidental movement from any cause, and which at the same time may be readily, easily and instantly adjusted by an operator to any place or position on the window, and the instant that the blind is released by the operator, it will be securely held as before described by said brake against accidental movement; and this invention also consists of means for adapting this apron or duster to windows of slightly varying width, as well as to hold blinds of varying width, size and weight by the one duster or brake, all of which will be hereinafter more fully set forth and described and pointed out in the claims.

Reference is to be had to the accompanying drawings forming part of this specification, wherein:

Figure 1 is a front view of a window and blind embodying my invention. Fig. 2 is an enlarged edge view of the window blind and attachments shown in Fig. 1. Fig. 3 is an enlarged detail front view of the roller and attachments. Fig. 4 is a detail view of one of the roller brackets and attachments for supporting the apron or duster rod.

In the accompanying drawings: the numeral 1 designates the window frame and 2 the window sash therein.

3 designates brackets which are secured to the front of the window frame on opposite sides of the window sash 2, and 4 a roller provided with a cap 5 and a short axle or trunnion 6 at one end, and with a spool 7 and a short axle or trunnion 8 at the other end, and said short axles or trunnions 6 and 8 are secured in the opposite ends of said roller 4, and are fitted to, supported by and rotate perfectly free in the sockets 9 in said brackets 3.

The spool 7 is formed by the washers, *a*, and, *b*, on opposite sides of a collar, *c*, and these three parts composing the spool 7 are supported on a reduced portion, *d*, of the roller 4, and are held thereon by a plate 10 mounted on the trunnion 8 between the reduced end, *d*, of the roller 4 and a shoulder, *e*, on said trunnion 8.

11 designates hangers pivotally supported by the pivot bolt 12 secured to the brackets 3.

13 designates a series of pin holes formed in the brackets 3; and 14 designates a pin which extends through a pin hole in the upper end of the hanger 11, and is adapted to be projected through any one of the series of said pin holes 13 in said brackets 3.

The lower ends, *f*, of the hangers 11 are bent at right angles to the vertical portion and are screw threaded and fitted to and adapted to be inserted in screw threaded sockets in the ends of the apron or duster rod 15.

16 designates an apron or duster one end of which is secured to the rod 15, and said apron then extends over the roller 4 and blind 17 rolled thereon, and to its free end a weight or stick 18 is secured to hold the free end of the apron or duster even and taut, and to increase the effect of the apron or duster as a brake.

19 designates a window blind stick in the lower free end of the blind 17 and 20 a tassel or pull also secured to the lower end of the blind or stick to provide a convenient means for operating without soiling the window blind by grasping it by the hand.

21 designates a cord secured at one end to the spool 7; 22 a stop on said cord and 23 a tassel or pull on the lower end of said cord 21.

24 designates a screw eye or loop secured in the rod 15 or to the window frame 1 adjacent to the spool 7 as preferred, through which screw eye or loop 24 said cord 21 extends.

The spool 7 is composed of two washers, *a*, $b$, and a collar, $c$, which are placed on the reduced end, $d$, of the roller 4, as shown in Fig. 3, the plate 10 is then placed on the axle or trunnion 8, and the latter driven into the end of the roller 4, until the shoulder, $e$, of the trunnion 8, binds the plate 10 tightly against the washer, $b$, which not only holds the washers, $a$, and, $b$, and collar, $c$, from falling off the reduced end, $d$, of the roller 4, but binds and clamps them tightly against the shoulder, $g$, and rigidly secures them to the roller so that the spool 7 and roller 4 will rotate together. This construction provides a simple, strong, durable and inexpensive construction for a spool, and for rigidly securing the spool and roller, so that they will rotate together. And to this spool 7 the operating cord 21 is secured, and to the roller 4 the blind or shade 17 is secured, and so arranged that by pulling down on this cord 21, the roller 4 is rotated and the blind 17 rolled up on said roller and raised. Again by grasping the tassel or pull 20 attached to the lower free end of the window blind 17, the latter is unrolled from the roller 4, and lowered and the cord 21 correspondingly rolled up on the spool 7; and in order to prevent excessive movement of the blind 17 downwards the cord 21 is extended through the screw eye 24 and is provided with a stop 22 so that when the lower end of the blind 17 is lowered to the bottom of the window the stop 22 engages with the screw eye or loop 24, and being larger than the loop of said screw eye, it cannot pass through it, and is held at that point; this prevents said blind 17 from being torn or otherwise injured by being stripped off the roller 4. And said tassel or pull 23, on the operating cord 21 is weighted, to hold the cord taut or evenly and firmly and in place as it is wound on or unwound from the spool 7, and the weight of said tassel or pull 23 is regulated according to the size or weight of the blind, and it thus assists in balancing the weight of blinds of different size or weight, particularly when the blind or shade 17 is adjusted to a lower position.

The apron or duster 16 is secured at one end to the rod or bar 15, it then extends over the roller 4, and blind or shade 17 rolled thereon, and this duster or apron extending over said blind or shade 17 and particularly over the portion of the latter on and adjacent to the roller 4, the dust settles and collects on this apron 16, the latter thus prevents the dust from settling on or collecting on the blind 17 on or adjacent to the roller 4, consequently the unsightly dust streaks which are so common on ordinary window blinds is avoided and completely prevented by the use of this duster or apron 16. And the rod 15 to which one end of the apron or duster 16 is secured, swinging on the hangers 11, from the bracket 3, the pin 14 may be adjusted in the hanger 11 and in one of the series of holes 13, in the bracket 3 to adjust the rod 15 and the end of the apron or duster 16 against the face of the blind or shade 17; and this end of the apron or duster 16 resting against the face of the blind 17 and covering the face of the blind 17 between the roller 4 and the rod 15, as the blind is raised any flies or insects on the blind are brushed off by the end of the apron 16, and the flies and insects being prevented from flying against the face of the blind above the rod 15, and those settling on the blind 17 below the rod 15 being brushed off by the end of the apron or duster 16, all crushing and consequent smearing of the blind by insects being rolled up with the blind between the latter and the roller 4, is avoided and completely prevented, the use of this construction therefor, overcoming and avoiding the unsightly smears of crushed insects and flies which is so common and which is met with so generally on blinds in ordinary use. This apron or duster 16 so arranged keeps the blinds fresh and clean, and the stick 18 on the free end of the duster or apron 16 is weighted to keep it taut, and to hold it smoothly and evenly over the blind. And this duster or apron extending over the roller 4 and resting on the blind or shade 17, it acts as a brake to firmly hold the blind at the position to which it is adjusted, and the brake effect of the apron or duster 16 may be regulated by the weight of the stick 18 in the free end of the apron or duster 16, or by regulating the pressure of the end of the apron or duster 16 on the face of the blind. And by turning the rod 15 the screw threaded ends, $f$, of the hangers 11 may be turned in or out of the rod 15, and thus increase or reduce the space between hangers 11, to adapt the rod, to windows of slightly varying width. And the operating cord 21 extending through the screw eye 24, the latter guides the cord to the spool 7, which together with the weighted tassel 23, compactly winds said operating cord 21 on said spool 7.

This combined duster and brake has been described in connection with a blind which has no springs or complicated parts to get out of order, as there are in spring roller blinds.

This combined automatic duster and brake for window blinds and shades therefore provides a device which is wonderfully simple, exceedingly durable, absolutely reliable and perfectly controllable.

While in the drawings forming part of this specification, there is illustrated one form of construction, embodying this invention, which is preferred, it is understood that the elements therein shown may be varied or changed as to shape, proportion, and exact manner of assemblage without departing from the spirit of this invention.

Having thus described my invention, I claim:

1. The combination with a blind or shade, of an apron trailed over said blind, an adjustable rod to which one end of said apron is secured and from which the apron is suspended, means for supporting said rod and means for securing the rod in adjusted position.

2. The combination with a blind or shade, of an apron trailed over said blind, a rod to which one end of said apron is secured, means for supporting said rod, and a weight secured to the free end of said apron, substantially as shown and described and for the purpose specified.

3. The combination with a blind or shade, of an apron trailed over said blind or shade, an adjustable rod to which one end of said apron is secured, means for supporting said rod, means for securing the rod in adjusted position, and a weight secured to the free end of said apron, substantially as shown and described and for the purpose specified.

4. In a device of the class described, a roller, a blind or shade secured thereto, a rod, hangers supporting said rod, and means for supporting said hangers and said roller, in combination with an apron secured to said rod and extending over the upper end of said blind, substantially as shown and described and for the purpose specified.

5. In a device of the class described, a roller, a blind or shade secured thereto, a rod, hangers in which said rod is supported and in which a pin hole is formed, brackets supporting said roller and said hangers, and in which a series of pin holes are formed, a pin extending through said pin hole in said hanger and one of said series of pin holes in said bracket, and an apron carried by said rod and passing over said roller, substantially as shown and described and for the purpose specified.

6. In a device of the class described, a roller, a blind or shade secured thereto, a rod, hangers for supporting said rod, and in which a pin hole is formed, brackets supporting said roller and said hangers, and in which a series of pin holes are formed, a pin extending through the pin hole in said hanger and into one of the series of pin holes in said bracket, an apron carried by the rod and passing over said roller, and a weight on the free end of said bracket, substantially as shown and described and for the purpose specified.

7. The combination with a blind or shade, a roller to which said blind is secured, brackets for supporting said roller in which a series of pin holes are formed, a spool secured to said roller, an operating cord secured to said spool, and a weighted tassel or pull secured to said cord, of a rod, hangers pivotally secured to said brackets and supporting said rod and in which a pin hole is formed, an apron secured to said rod and adapted to extend over said blind, and a pin extending through a pin hole in said hangers and through one of the series of pin holes in said brackets, substantially as shown and described and for the purpose specified.

8. The combination with a blind or shade, a roller to which said blind is secured, brackets for supporting said roller in which a series of pin holes are formed, a spool secured to said roller, an operating cord secured to said spool, and a weighted tassel or pull secured to said cord, of a rod, hangers pivotally secured to said brackets and supporting said rod, and in which a pin hole is formed, an apron secured to said rod and adapted to extend over said blind, a pin extending through a pin hole in said hangers and through one of the series of pin holes in said brackets, and a weight secured to the free end of said apron, substantially as shown and described and for the purpose specified.

9. The combination with a blind or shade, a roller to which said blind is secured, a spool secured to said roller, an operating cord secured to said spool, and a weighted tassel or pull and a stop secured to said cord, of a rod, a screw eye or loop secured to said rod, an apron secured to said rod, and adapted to extend over the upper end of said blind, and means for supporting said roller and said rod, substantially as shown and described and for the purpose specified.

In testimony whereof, I have signed in the presence of the two undersigned witnesses.

FREDERICK J. WATKINSON.

Witnesses:
P. J. EDMUNDS,
B. GIRARD.